July 20, 1948.    M. WATTER    2,445,747

INDENTATION-FREE WELDING

Filed March 19, 1946

INVENTOR
Michael Watter.

BY
*Donald B. Waite*
ATTORNEY

Patented July 20, 1948

2,445,747

UNITED STATES PATENT OFFICE 2,445,747

INDENTATION-FREE WELDING

Michael Watter, Philadelphia, Pa., assignor to The Budd Company, Philadelphia, Pa., a corporation of Pennsylvania Application March 19, 1946, Serial No. 655,397

8 Claims. (Cl. 219—4)

This invention relates to resistance welding, with particular applicability to welding electrodes.

In the usual form of resistance welding employing coacting electrodes, the heat developed by the welding current at the weld point is as a general rule sufficient to bring about indentations on the workpiece surfaces between the electrodes. These indentations arise from the softening of the workpiece metal between the electrode tips accompanied by the pressure of the electrodes which forces out the softened nugget material resulting on cooling in a definite surface indentation.

One of the important objects of this invention is to provide welding electrodes having tips of such formation as normally to prevent the formation of identations at least on one side of the workpiece so that this side presents a smooth surface after the welding is completed.

A second object is to secure in an electrode a substantial area of contact of the electrode tip on the workpiece without reducing the current density during the welding cycle to a point where the weld is defective.

Still another object of the invention is to form a novel combination of metal and dielectric substance at an electrode tip, the dielectric material being fixed to the electrode in such a manner as to prevent spreading due to electrode pressure.

A further object of the invention is to provide an electrode having combination dielectric and metal tip areas for indentation prevention.

Figure 1:
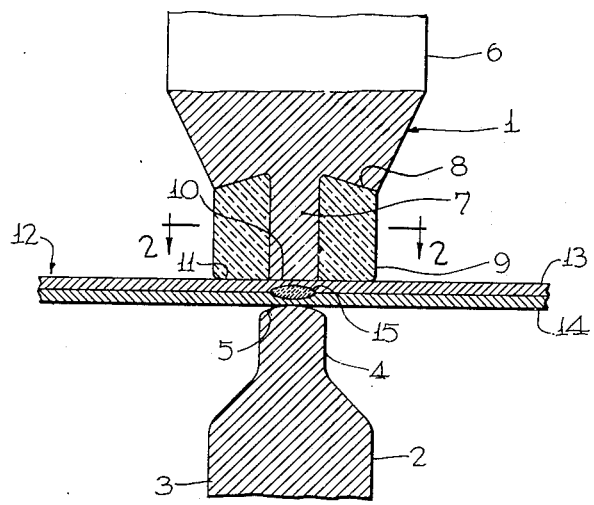
Figure 2:
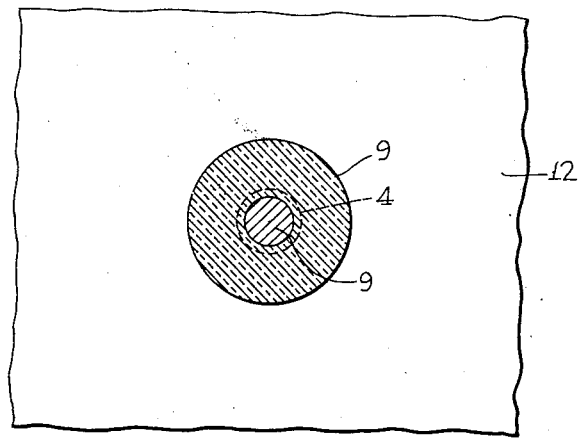

Reference is made to the following disclosure of the invention and to the accompanying drawing, in which:

Figure 1 is a view in section of two cooperating electrodes with an intervening workpiece, showing the modified electrode of the invention; and Figure 2 is a section taken along lines 2—2 of Figure 1.

As shown in Figure 1, two electrodes are indicated, numbered 1 and 2, electrode 1 being the modified electrode and electrode 2 being of conventional shape with a main support section 3 and a tip section 4 of reduced diameter. The working surface 5 of the tip is preferably spherical in contour. The upper electrode 1 consists of the usual supporting section 6 and a tip section 7. This tip projects centrally from a dished surface 8 on the workpiece end of the electrode, as indicated. Surrounding and attached to the tip section 7 is a cylinder 9 of non-conducting or dielectric material, such as various types of plastic composition, fibre and the like, which is shaped at its upper end to conform to the dished-out area 8 of the electrode, this area forming a seat for the cylinder. The working ends 10 and 11 of the metal tip and the dielectric cylinder, respectively, lie on a common plane perpendicular to the electrode axis so as to present a flat surface to the workpiece 12. The workpiece is shown as of two metal sheets or strips 13 and 14 with a nugget 15 positioned at the interface of the sheets in line with the electrode tips 7 and 4.

It is pointed out that the combined area of the metal tip 7 and dielectric cylinder 9 at the workpiece is substantially in excess of the bearing area of the lower electrode 2. The purpose of this enlarged area is to insure adequate pressure on the workpiece so as to obtain the proper flow of current between the strips. Without the dielectric cylinder the pressure would be concentrated on the relatively smaller tip 7, and the tendency, therefore, on the application of high welding heats over a period of time would be to bend or buckle the tip. The dielectric cylinder supports the tip and distributes the pressure so that there is no deformation resulting from continued welding operation.

It is pointed out, further, that the diameter of the tip 7 is such as to produce the necessary current density for obtaining a good weld. Similar results as regards pressure might be obtained by a relatively large diameter metal tip on the upper electrode, but in such an enlarged electrode the current density would be necessarily reduced to a point where defective welds would result. By combining with an electrode tip of a diameter no more is necessary to secure the desired current density a cylinder of dielectric substance capable of resisting the welding pressure, there is obtained a modified electrode which obtains development of this satisfactory weld under appropriate pressures.

Also, attention is directed to the flat form of the bearing surface of the tip of the upper electrode, and the coplanar alignment of the metal and dielectric surfaces. By this construction the upper electrode pressure is evenly distributed on the outer surface of the upper workpiece sheet in cooperation with the spherically tipped surface of the lower electrode. Should the workpiece have a curved surface, the tip of the upper electrode is shaped to conform thereto.

The specific form of the electrodes is of course subject to modification, the scope of the invention being as stated in the accompanying claims.

What is claimed is:

1. In resistance welders, a first metal electrode having a tip, a second coacting metal electrode having a tip of lesser diameter than the tip of the first electrode, and a tube of electrically non-conducting material surrounding the tip of the second electrode, the bearing faces of the tip and tube of the second electrode lying in a common plane passing at right angles through the axis of the second electrode.

2. In resistance welders, a first electrode having a work-engaging tip, a second coacting electrode having a metal tip adapted for cooperation with the tip of the first electrode, the transverse area at the bearing surface of said second electrode tip being substantially less than the bearing area of the first electrode tip, and an electrically non-conducting material surrounding the second electrode tip with a surface adjacent the bearing surface of the tip and coextensive therewith.

3. In resistance welders, a first electrode having a work-engaging tip, a second coacting electrode having a metal tip adapted for engagement with the tip of the first electrode, the transverse area at the bearing surface of said second electrode tip being substantially less than the bearing area of the first electrode tip, and an electrically non-conducting material surrounding the second electrode tip and having a surface adjacent the bearing surface of the tip coextensive therewith, said non-conducting material forming a tube having a surface at the end thereof opposite to the tip end of the electrode interlocking with the body of the second electrode.

4. In resistance welding apparatus, a first electrode having a cylindrical tip of a given diameter, a second electrode in cooperative position relative to the first electrode for retention of a workpiece, said second electrode having a cylindrical tip of a diameter less than the tip of the first electrode, and a cylinder of electrically non-conducting material enclosing said second electrode tip and forming therewith a flat surface at the workpiece-engaging end thereof.

5. In resistance welding apparatus, a first electrode having a tip with a rounded bearing surface, a second electrode having a tip with a flat bearing surface, the bearing area of the tip of the second electrode being lesser than the bearing area of the tip of the first electrode, and pressure-transmitting and indentation-preventing means enclosing the tip of the second electrode, said means comprising a body of dielectric material enclosing the electrode tip, the combined area of the bearing surface of the second electrode tip and the bearing area of the enclosing material of said tip being greater than the bearing surface of the first electrode tip.

6. In resistance welding apparatus, a first electrode having a tip of a given diameter, a second electrode positioned in coacting relationship with the first electrode and adapted with the first electrode to engage a workpiece for welding, said second electrode having a tip of a diameter less than the tip of the first electrode, and a tube of electrically non-conducting material enclosing said second electrode tip, the extreme tip end of the second electrode lying in an extension of the surface area of the tube tip.

7. In resistance welding apparatus, a first electrode having a tip, and a second electrode having a tip positioned in coacting relationship with the first electrode tip and adapted with the first electrode tip to engage a workpiece for welding, said second electrode tip being surrounded by a tube of electrically non-conducting material, and the extreme tip end of the second electrode lying in an extension of the surface area of the tube tip.

8. In resistance welding apparatus, a first electrode having a tip, and a second electrode having a tip positioned in coacting relationship with the first electrode tip and adapted with the first electrode tip to engage a workpiece for welding, said second electrode tip being surrounded by a tube of electrically non-conducting material rigidly secured with respect to said second electrode tip, and the extreme tip end of the second electrode lying in an extension of the surface area of the tube tip.

MICHAEL WATTER.

REFERENCES CITED

The following references are of record in the file of this patent:

UNITED STATES PATENTS

| Number | Name | Date |
|---|---|---|
| 1,061,376 | Heany | May 13, 1913 |
| 1,189,581 | Kicklighter | July 4, 1916 |
| 1,206,890 | Murray et al. | Dec. 5, 1916 |
| 1,618,764 | Lunn | Feb. 22, 1927 |
| 1,677,206 | Pugh (1) | July 17, 1928 |
| 1,810,225 | Pugh (2) | June 16, 1931 |
| 1,992,990 | Burns | Mar. 5, 1935 |
| 2,079,857 | Holan | May 11, 1937 |
| 2,244,455 | Gengenbach | June 3, 1941 |
| 2,282,186 | Henninger | May 5, 1942 |

FOREIGN PATENTS

| Number | Country | Date |
|---|---|---|
| 262,112 | Great Britain | Jan. 20, 1927 |